(12) United States Patent
Shewan et al.

(10) Patent No.: US 12,383,051 B2
(45) Date of Patent: Aug. 12, 2025

(54) GRILL-CLEANING TOOL

(71) Applicant: Helen of Troy Limited, St. Michael (BB)

(72) Inventors: Erik Shewan, Tarrytown, NY (US); Samuel Fear, Mattituck, NY (US); Mackenzie Mor, Brooklyn, NY (US)

(73) Assignee: KAZ EUROPE SÀRL, Bussigny (CH)

( * ) Notice: Subject to any disclaimer, the term of this patent is extended or adjusted under 35 U.S.C. 154(b) by 432 days.

(21) Appl. No.: 17/830,743

(22) Filed: Jun. 2, 2022

(65) Prior Publication Data

US 2023/0389687 A1 Dec. 7, 2023

(51) Int. Cl.
| | | |
|---|---|---|
| *A46B 7/04* | (2006.01) | |
| *A46B 9/02* | (2006.01) | |
| *A46D 1/00* | (2006.01) | |
| *A47J 37/07* | (2006.01) | |

(52) U.S. Cl.
CPC ............ *A46B 7/042* (2013.01); *A46B 9/026* (2013.01); *A46D 1/0207* (2013.01); *A47J 37/0786* (2013.01); *A46B 2200/3073* (2013.01); *A46B 2200/3093* (2013.01)

(58) Field of Classification Search
CPC .... A46B 2200/3093; A46B 2200/3073; A46B 9/026; A47J 37/0786; A46D 1/0207; A47B 7/02
USPC ............................................................. 15/160
See application file for complete search history.

(56) References Cited

U.S. PATENT DOCUMENTS

| | | | |
|---|---|---|---|
| 681,707 | A | 9/1901 | Johnson |
| 921,136 | A | 5/1909 | Marsolais |
| 2,152,697 | A | 10/1936 | Kingman |
| 2,140,578 | A | 12/1938 | Goodloe |
| 2,156,494 | A | 5/1939 | Goodloe |
| D417,324 | S | 11/1999 | Farls |
| 6,276,023 | B1 | 8/2001 | Grundy |
| 7,168,124 | B2 | 1/2007 | Dalias |
| 10,188,256 | B2 | 1/2019 | Weinberger |
| 10,602,904 | B2 | 3/2020 | Weinberger |
| 10,898,930 | B1 * | 1/2021 | Garcia ................... A47L 13/16 |
| 2005/0160544 | A1 | 7/2005 | Geller |
| 2018/0263455 | A1 * | 9/2018 | Weinberger ............. B25G 3/14 |
| 2019/0053668 | A1 | 2/2019 | Norris |

FOREIGN PATENT DOCUMENTS

WO 2019/186215 10/2019

* cited by examiner

*Primary Examiner* — Katina N. Henson
(74) *Attorney, Agent, or Firm* — RANKIN, HILL & CLARK LLP (57) ABSTRACT

A grill-cleaning tool includes a cleaning head and a cleaning implement connected to an underside of the cleaning head. The cleaning implement includes a first end and a second end opposite the first end relative to a length dimension of the cleaning head, and a first side and a second side opposite the first side relative to a width dimension of the cleaning head. The cleaning implement includes a compressible member and a scrubbing member covering the compressible member. The scrubbing member is fabricated from a metallic-mesh material and defines a working outer surface of the cleaning implement. At least one clamp is connected to one of the underside of the cleaning head and the cleaning implement. The at least one clamp is configured to secure the scrubbing member in place on the compressible member.

18 Claims, 6 Drawing Sheets

GRILL-CLEANING TOOL

BACKGROUND

One problem that is common to all grills is that grease and particles from the food that is being cooked will accumulate onto cooking grates. This accumulation becomes charred and hardened and remains on the cooking grates after the food is done cooking. It is desirable to clean the grill and thereby remove the charred and hardened residue prior to the next use. This task is complicated due to the physical structure that is typical of cooking grates, which normally include a set of parallel rods or bars with spaces therebetween for allowing the grease and food particles to drip between the rods or bars.

Grill-cleaning tools are very popular for cleaning the grill cooking grates. Rigid scrapers fabricated from steel, wood or plastic, either with or without a grooved cleaning edge, can be used to scrape the residues off the upper surface of the cooking grates. Alternatively, cleaning brushes that have wire or plastic bristles are widely used because the bristles are able to spread apart and clean the sides of the rods or bars as well as their upper surfaces. Unfortunately, the only abrasive surfaces of these brushes are the bristles tips, which lack resilience and quickly become permanently deformed with repeated use. Additionally, conventional brushes have a number of crevices and tightly packed bristles that are difficult to clean. In view of the above deficiencies, there is a need for a grill-cleaning tool having an improved abrasive surface to efficiently and effectively clean a grill cooking grate.

SUMMARY

According to one aspect, a grill-cleaning tool comprises a cleaning head and a cleaning implement connected to an underside of the cleaning head. The cleaning implement includes a first end and a second end opposite the first end relative to a length dimension of the cleaning head, and a first side and a second side opposite the first side relative to a width dimension of the cleaning head. The cleaning implement includes a compressible member and a scrubbing member covering the compressible member. The scrubbing member is fabricated from a metallic-mesh material and defines a working outer surface of the cleaning implement. At least one clamp is connected to one of the underside of the cleaning head and the cleaning implement. The at least one clamp is configured to secure the scrubbing member in place on the compressible member.

According to another aspect, a grill-cleaning tool comprises a cleaning head including a first mounting structure and a cleaning implement removably connected to an underside of the cleaning head. The cleaning implement includes a cartridge, a compressible member mounted within the cartridge, a scrubbing member fabricated from a metallic-mesh material, the scrubbing member covering the compressible member, the scrubbing member defining a working outer surface of the cleaning implement, and at least one clamp connected to the cartridge and configured to secure the scrubbing member in place on the compressible member. A second complementary mounting structure is carried by the cartridge for engagement with the first mounting structure.

According to another aspect, a method of assembling a grill-cleaning tool is provided. The method comprises providing a compressible member; providing a scrubbing member fabricated from a metallic-mesh material made from interconnected metal coils; positioning the scrubbing member directly over an outer surface of the compressible member; wherein the scrubbing member positioned over the compressible member defines cleaning implement for the tool. The method further includes providing a first clamp, positioning the first clamp adjacent a first end the cleaning implement, and moving the first clamp into engagement with the scrubbing member; and providing a second clamp, positioning the second clamp adjacent a second end the cleaning implement that is opposite the first end, and moving the second clamp into engagement with the scrubbing member, wherein engagement of the first and second clamps with the scrubbing member secures the scrubbing member on the compressible member.

DETAILED DESCRIPTION

It should, of course, be understood that the description and drawings herein are merely illustrative and that various modifications and changes can be made in the structures disclosed without departing from the present disclosure. Spatially relative terms may be used to describe an element and/or feature's relationship to another element(s) and/or feature(s) as, for example, illustrated in the figures. It will be understood that the spatially relative terms are intended to encompass different orientations of the exemplary grill-cleaning tool in use in addition to the orientation depicted in the figures. Further, any term of degree used herein, such as "substantially", means a reasonable amount of deviation of the modified word is contemplated such that the end result is not significantly changed.

Figure 1:
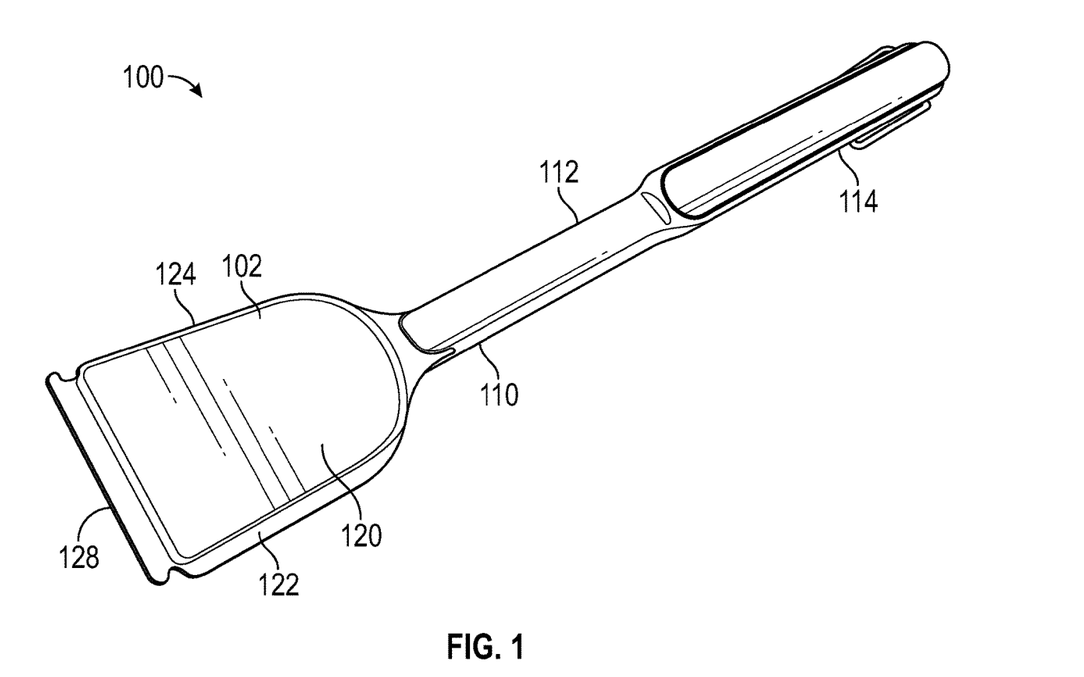
FIGS. 1 and 2 are perspective views of a grill-cleaning tool according to the present disclosure, the grill-cleaning tool including a cleaning head and a cleaning implement adapted for releasable connection to the cleaning head.
Figure 2:
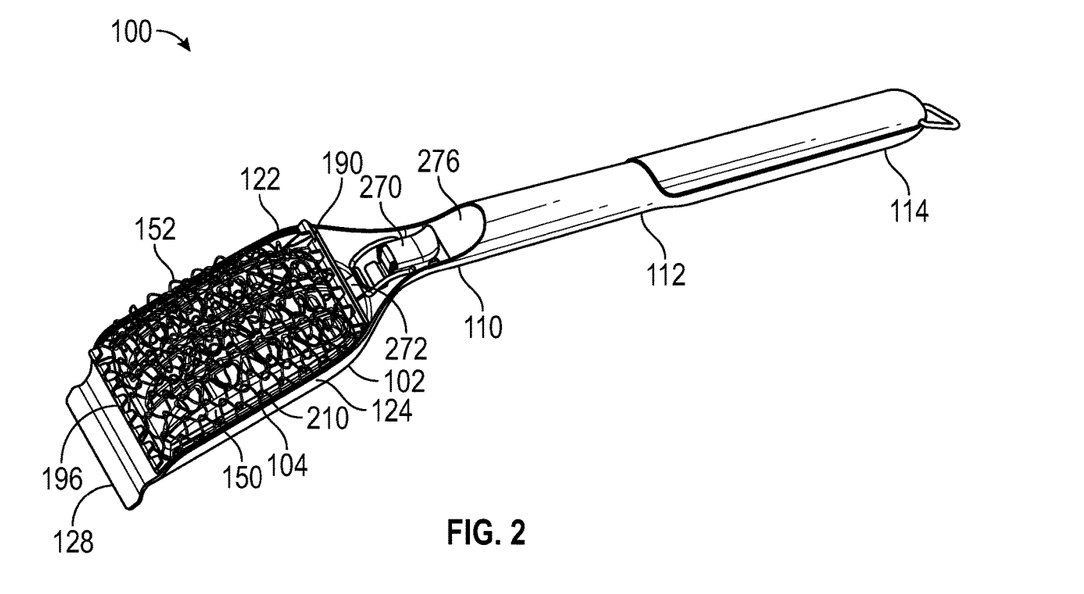
Figure 3:
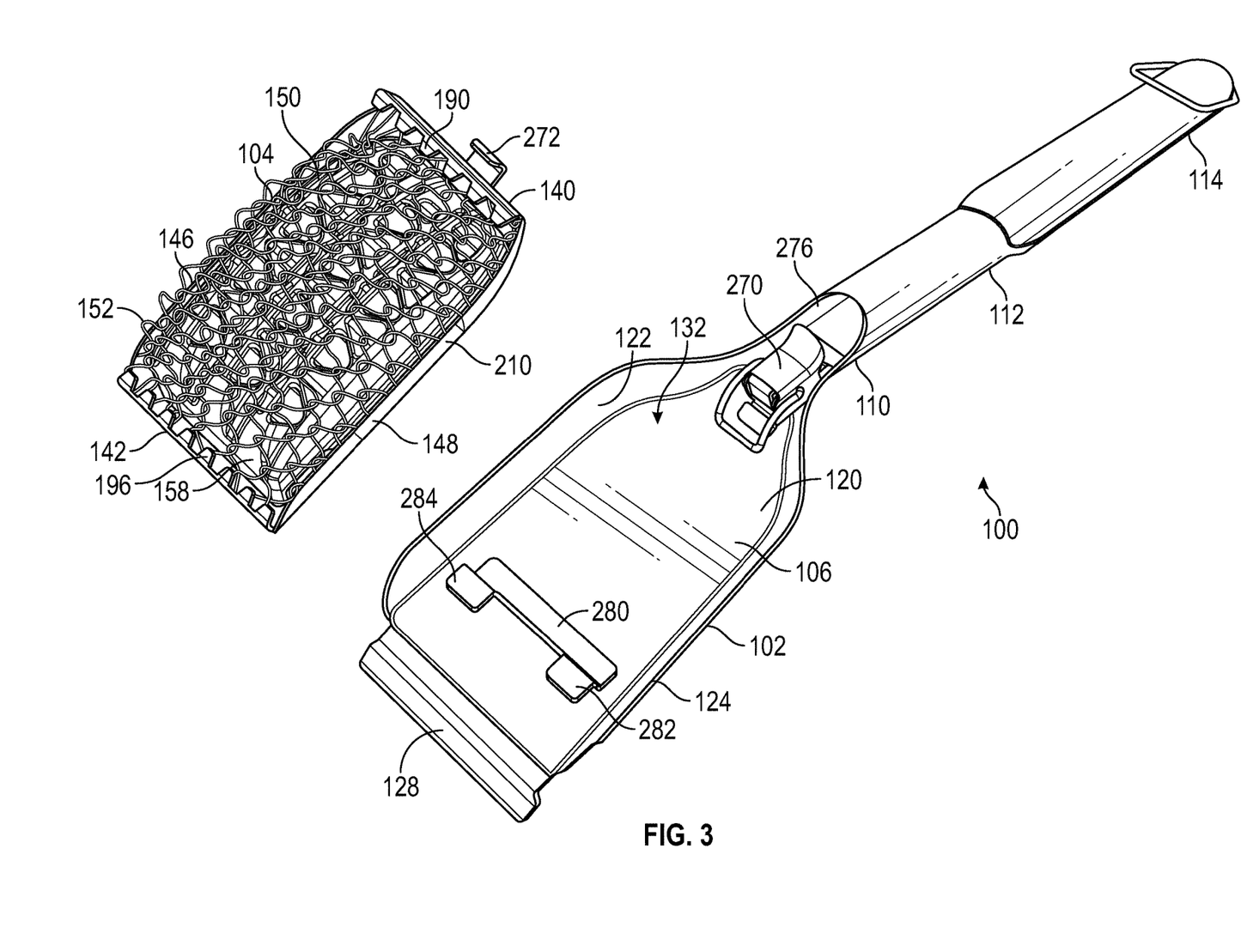
FIG. 3 is a partial exploded perspective view of the grill-cleaning tool of FIG. 2.

Referring now to the drawings, wherein like numerals refer to like parts throughout the several views, FIGS. 1-3 illustrate an exemplary grill-cleaning tool 100 according to the present disclosure. It should be appreciated that the term "cleaning" herein refers to the removal of unwanted material from a surface of a grill cooking grate, such as by abrading the surface. The grill-cleaning tool 100 generally includes a cleaning head 102 and a cleaning implement 104 connected to an underside 106 of the cleaning head. The cleaning head 102 can be connected to a distal end portion 110 of a handle 112. As shown, the handle 112 includes a proximal end portion 114 opposite the distal end portion 110, the proximal end portion defining a user gripping portion of the handle 112. In the depicted aspect, the cleaning head 102 and the handle 112 are integrally formed to define a unitary, one-piece component; although, it should be appreciated that the cleaning head 102 can be a separate component that can be optionally coupled to the handle by, for example, a latch, a clasp, a screw, or other like fastener. This arrangement allows for the use of the cleaning head 102 and cleaning implement 104 without the handle 112. The cleaning head 102 includes the underside 106 defined by a base 120, sidewalls 122, 124 extended from the base 120 and spaced in a width or lateral direction of the base, and a scrapper 128 extended from the base 120 in a length or longitudinal direction of the base. As depicted, the scrapper 128 is integral with the cleaning head 102 and is located opposite the handle 112. The base 120 and the sidewalls 122, 124 define a partial enclosure 132 for the cleaning implement 104.

In FIGS. 2 and 3, the cleaning implement 104 extends from the cleaning head 102 and is adapted for cleaning a surface of a grill cooking grate. The cleaning implement 104 includes a first end or end portion 140 and a second end or end portion 142 opposite the first end relative to a length dimension of the cleaning implement 104 (which is along the length or longitudinal direction of the base 120). The cleaning implement 104 includes a first side or side portion 146 and a second side or side portion 148 opposite the first side relative to a width dimension of the cleaning implement 104 (which is along the width or lateral direction of the base 120). When mounted in the partial enclosure 132 and to the underside 106 of the cleaning head 102, the first end 140 is adjacent the distal end portion 110 of the handle 112, the second end 142 is adjacent the scrapper 128, the first side 146 is adjacent the sidewall 122, and the second side 148 is adjacent the sidewall 124. The cleaning implement 104 further includes a compressible member 150 and a scrubbing member 152 covering the compressible member and defining a working outer surface of the cleaning implement.

Figure 4:
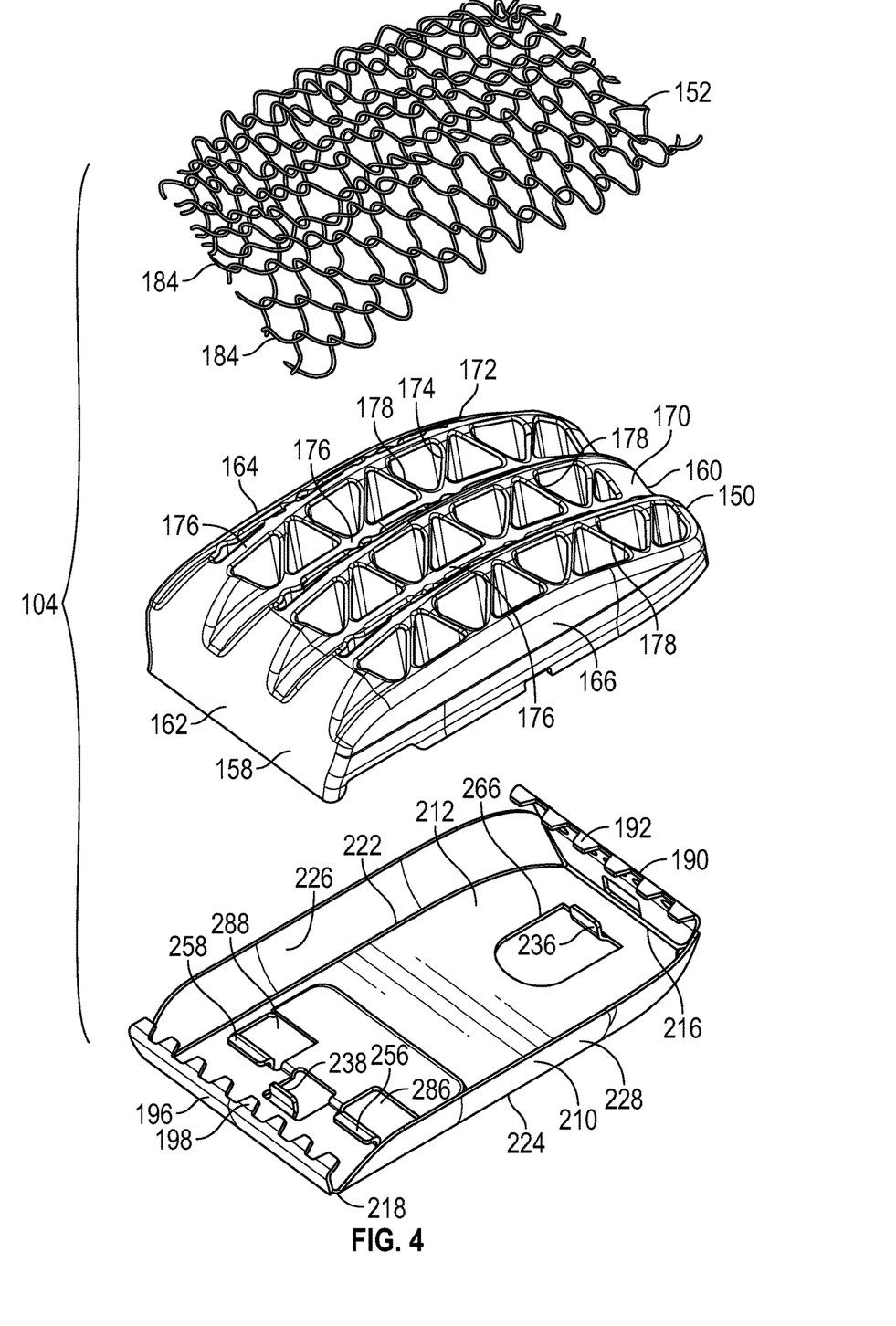
FIG. 4 is an exploded perspective view of the cleaning implement.

With reference to FIGS. 3 and 4, the compressible member 150 of the exemplary cleaning implement 104 includes a body 158 having first and second ends or end portions 160, 162 spaced apart in the length dimension of the cleaning implement 104, and first and second sides or side portions 164, 166 spaced apart in the width dimension of the cleaning implement 104. An outer surface 170 of the body 158 which is in direct contact with the scrubbing member 152 can be contoured to allow the scrubbing member 152 to clean the rods or bars of the cooking grate sides as well as their upper surfaces. In the present embodiment, the outer surface 170 is defined by peaks 172 and valleys 174 arranged in an alternating manner in the width direction of the cleaning implement. As shown, the peaks 172 can be defined by first ribs 176 elongated in the in the length dimension of the cleaning implement, and the valleys 174 can be defined by second ribs 178 interconnecting the first ribs. Although, it should be appreciated that the outer surface 170 of the body 158 can be substantially smooth. The compressible member 150 can be fabricated from a fire-resistant, flexible and resilient material (for example, silicone, foam, fibrous material) that imparts flexibility to and offsets the stiffness the scrubbing member 152. To further the flexibility of the compression member 150, the second ribs 178 can be arranged in a manner to as to form substantially triangular shaped openings between the first ribs 176 and extended through the body 158. However, it should also be appreciated that the body 158 of the compressible member is a solid body with no through openings, wherein the outer surface is contoured as described above or substantially smooth.

The exemplary scrubbing member 152 is fabricated from a metallic-mesh material and defines the working outer surface of the cleaning implement 104. The term "metallic-mesh" is intended to mean a material that is fabricated (i.e., woven) from a plurality of interconnected elongated structural members (such as wires, ropes, springs, coils, and the like) formed, for example, of a metal or metal alloy, such as stainless steel. The term "metallic mesh" is also intended to mean a chain mail arrangement of interlocking elongated structural members, again formed, for example, of a metal or metal alloy, that when woven together provide interlinked loops. In the depicted aspect, the scrubbing member 152 is formed of interconnected coils 184. The coils 184 are elongated in the length dimension of the cleaning implement 104 and are interconnected in a manner to provide relative movement between the individual coils 184. This allows the scrubbing member 152 to substantially conform to the outer surface 170 of the compressible member body 158 during use of the grill-cleaning tool. Further, with the contoured shape of the outer surface 170 (i.e., the peaks 172 and valleys 174), the coils 184 are arranged in substantially parallel rows having first and second different heights. This allows the coils 184 of the scrubbing member 152 to extend between the spaces formed between adjacent parallel grate rods or bars while scraping and cleaning a top surface of the grill cooking grate. Therefore, the cleaning implement 104 includes the scrubbing member 152 and the compressible member 150 positioned adjacent to the scrubbing member such that the compressible member is capable of applying pressure against the scrubbing member 152 enabling the scrubbing member 152 to move and conform to the contours of the grill-cleaning grate.

Figure 8:
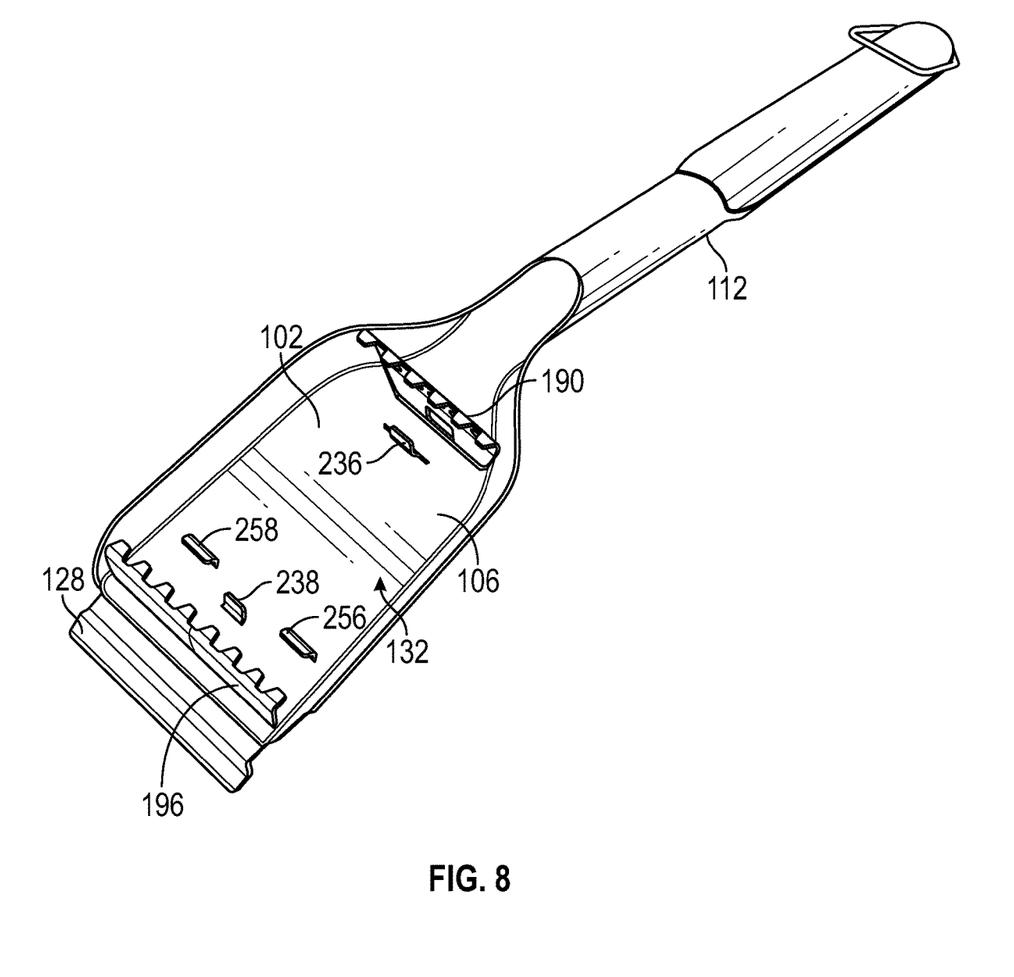
FIG. 8 is a perspective view of an alternate aspect of the cleaning head of the grill-cleaning tool, wherein the cleaning element of FIG. 6 is non-removably connected to the cleaning head.

According to the present disclosure, at least one capture tab or clamp is connected to one of the underside 106 of the cleaning head 102 and the cleaning implement 104. The at least one clamp is configured to secure the scrubbing member 152 in place on the compressible member 150. The at least one clamp when provided on the cleaning head 102 is intended to non-removably secure the cleaning implement to the cleaning head (FIG. 8). The at least one clamp when provided on the cleaning implement 104 is intended to removably secure the cleaning implement 104 to the cleaning head 102 (FIGS. 3 and 4). As depicted in FIGS. 3, 4 and 8, the at least one clamp is a first capture tab or clamp 190 which is located at the first end 142 of the cleaning implement 104. The first clamp 190 is configured to be moved or rotated into engagement with the scrubbing member 152, securing the scrubbing member at the first end 160 of the compressible member body 158. According to one aspect, to assist in securing of the scrubbing member 152, the first clamp 190 includes an engaging edge portion 192 extended in the width dimension of the cleaning implement 104, the edge portion 192 configured to engage the coils 184 of the scrubbing member. By way of example, the edge portion 192 can be notched to define teeth adapted to engage the coils 184, and optionally engage the compressible member 150.

Further securing the scrubbing member 152 on the compressible member 150 is a second capture tab or clamp 196. The second clamp 196 is also connected to one of underside 106 of the cleaning head 102 and the cleaning implement 104, depending on whether the cleaning implement is removable from the cleaning head. In FIGS. 3, 4 and 8, the second clamp 196 is located at the second end 144 of the cleaning implement 104, opposite the first clamp 190. The second clamp 196 is also configured to be moved or rotated into engagement with the scrubbing member 152, securing the scrubbing member at the second end 162 of the compressible member body 158. Similar to the first clamp 190, to assist in securing of the scrubbing member 152, the second clamp 196 includes an engaging edge portion 198 extended in the width dimension of the cleaning implement 104, the edge portion 198 configured to engage the scrubbing member. Again, by way of example, the edge portion 198 can be notched to define teeth adapted to engage the coils 184, and optionally engage the compressible member 150.

The cleaning implement 104 depicted in FIGS. 2-5 is configured to be removable from the cleaning head 102. To that end, the cleaning head 102 includes a first mounting structure and the cleaning implement 104 includes a second complementary mounting structure for releasable engagement with the first mounting structure. According to one aspect, the second complementary mounting structure is provided on a cartridge 210 of the cleaning implement 104, thereby allowing for the removable connection of the cartridge 210 to the underside 106 of the cleaning head 102. In the depicted embodiment, the cartridge 210 is shaped and sized to secure the compressible member 150 and the scrubbing member 152, with both the compressible member and the scrubbing member partially projecting outwardly from the cartridge 210. The cartridge 210 includes a base 212 having an outer perimeter shaped correspondingly to the body 158 of the compressible member 150, which provides for a compact design of the cleaning implement fitted within a footprint of the cleaning head 102. The base 212 includes opposite ends or end portions 216, 218 and opposite sides or side portions 222, 224, with sidewalls 226, 228 extended from the respective sides 222, 224. As shown, the first clamp 190 is provided at the end 216 and the second clamp 196 is provided at the end 218, the first and second clamps 190, 196 defining end walls of the cartridge. As shown, the base 212, the sidewalls 226, 228 and the first and second clamps 190, 196 are integrally formed to define a one-piece, unitary component for the cleaning implement 104 that at least partially houses and secures the compressible member 150 and the scrubbing member 152.

Figure 5:
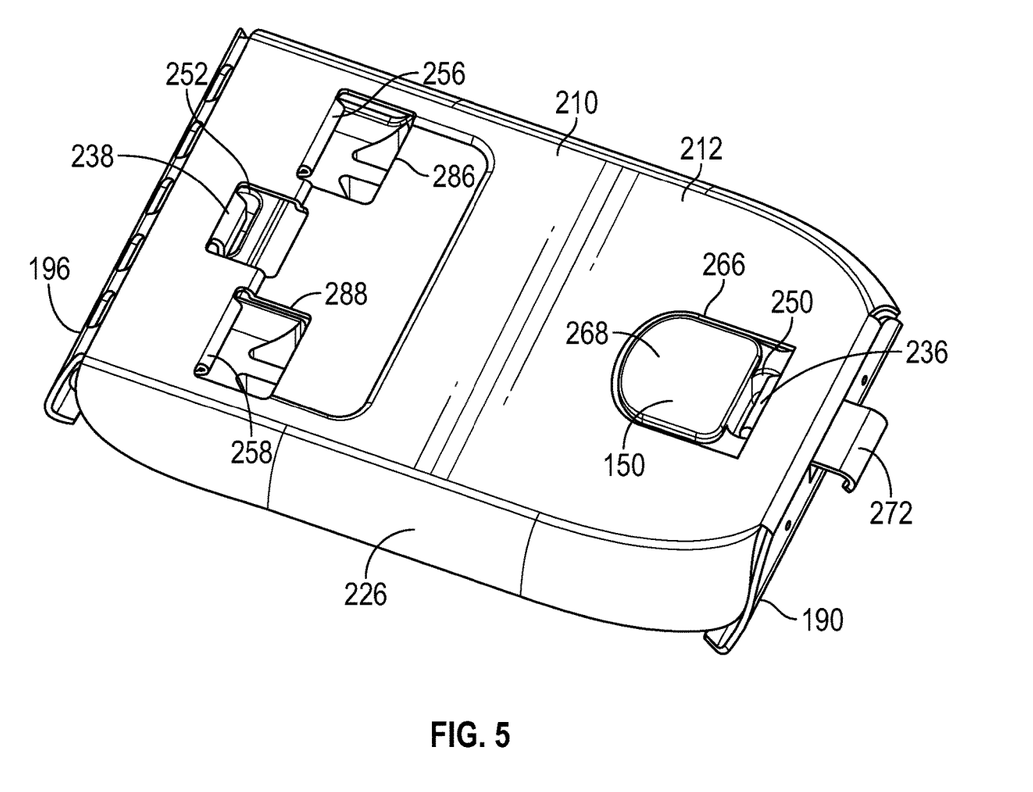
FIG. 5 is a bottom perspective view of the cleaning implement
Figure 6:
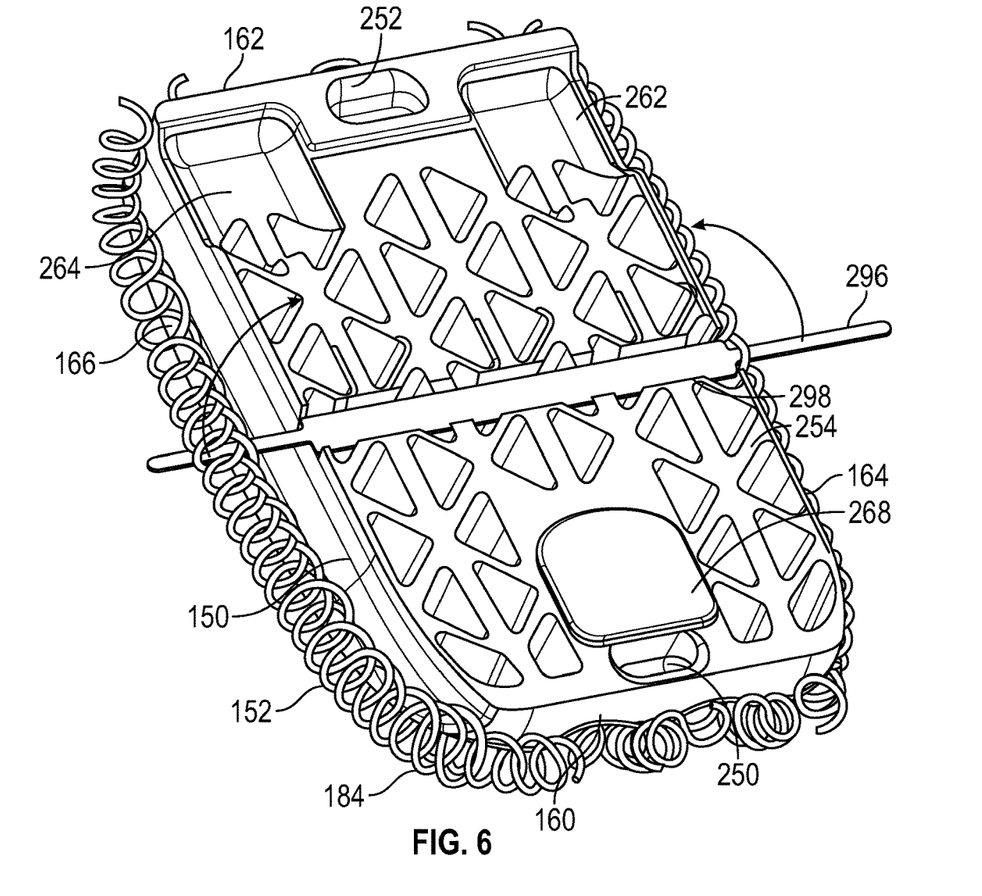
FIGS. 6 and 7 are partial perspective views showing an exemplary method of assembling the cleaning implement.

According to the present disclosure, a first locating tab 236 and a second locating tab 238 are connected to one of the underside 106 of the cleaning head 102 (FIG. 8) and the cleaning implement 104 for securing the compressible member 150. In the embodiment of FIGS. 2-5, the base 212 of the cartridge 210 includes the first and second locating tabs 236, 238 for mounting the compressible member 150 within the cartridge 210. The locating tabs 236, 238 can be positioned at the respective ends 216, 218 of the base 212; although, that is not required. In FIGS. 5 and 6, the first and second locating tabs 236, 238 are received in respective first and second openings 250, 252 provided on a bottom surface 254 of the compressible member 150. It should be appreciated that a spacing between the first and second openings 250, 252 can be less than a spacing between the first and second locating tabs 236, 238. The differing spacing between the locating tabs and corresponding openings requires the compressible member 150 to be at least partially stretched for fitting onto the first and second locating tabs 236, 238. And when properly fitted, the compressible member 150 at least partially contracts thereby securing the first and second locating tabs 236, 238 in the respective first and second openings 250, 252. Additional locating tabs 256, 258 are provided on the base 212 of the cartridge 210. The additional locating tabs 256, 258, which can be adapted to further secure the compressible member 150, are located in respective recesses 262, 264 provided on the bottom surface 254 of the compressible member 150. To further align the compressible member 150 within the cartridge 210, as shown in FIG. 5, a cutout 266 can be provided on the base 212, the cutout sized to receive a corresponding shaped protrusion 268 on the bottom surface 254 of the compressible member 150.

It should be appreciated that in the embodiment of the grill-cleaning tool 100 shown in FIG. 8, the base 120 of the cleaning head 102 includes the first and second locating tabs 236, 238 for mounting the compressible member 150 as described above within the enclosure 132 defined by the cleaning head. The base 120 of the cleaning head 102 can further include the additional locating tabs 256, 258; although, this is not required.

In FIGS. 2 and 3, the first mounting structure of the cleaning head 102 and the second mounting structure of the cartridge 210 include a latching arrangement. The latching arrangement is carried by the cleaning head 102 and the cartridge 210 for the removable connection of the cartridge to the cleaning head. The latching arrangement of the present disclosure includes a latch 270 and a keeper 272 detachably engaged by the latch. In the depicted aspect, the latch 270 is positioned at least partially in a recessed portion 276 at the distal end portion 110 of the handle 112, and the recessed portion is sized such that in a side view of the grill-cleaning tool 100 the latch is substantially concealed by the handle. This ensures that the latch 270 does not interfere with the use of the grill-cleaning tool 100. The keeper 272 is connected to and extended from the cartridge 210, specifically the first clamp 190. It should be appreciated that in lieu of the depicted latching arrangement, the cleaning implement 104 can be removably attached to the cleaning head 102 by a bolt, a screw, a clasp, a hasp or other like fastener. As shown, the first mounting structure of the cleaning head 102 further includes a bracket 280 fixed to the base 120 of the cleaning head 102. The bracket 280 includes securing tabs 282, 284 for receipt in correspondingly shaped openings 286, 288 of the second mounting structure that are extended through the base 212 of the cartridge. When properly received in the openings 286, 288, the securing tabs 282, 284 engage over the additional locating tabs 256, 258 provided on the cartridge 210 (the additional locating tabs 256, 258 further defining the second mounting structure), pressing the cartridge against the base 120.

As is evident from the foregoing, a method of assembling the grill-cleaning tool 100 is also disclosed. The exemplary method comprises providing a compressible member 150; providing a scrubbing member 152 fabricated from a metallic-mesh material made from interlocking stainless steel coils 184; and positioning the scrubbing member 152 directly over an outer surface of the compressible member 150, wherein the scrubbing member positioned over the compressible member defines a cleaning implement 104 for the grill-cleaning tool 100. The exemplary method includes providing a first clamp 190, positioning the first clamp adjacent a first end of the cleaning implement 104, and moving or rotating the first clamp into engagement with the scrubbing member 152; and providing a second clamp 196, positioning the second clamp adjacent a second end the cleaning implement that is opposite the first end, and moving or rotating the second clamp into engagement with the scrubbing member 152, wherein engagement of the first and second clamps 190, 196 with the scrubbing member 152 secures the scrubbing member on the compressible member 150.

Figure 7:
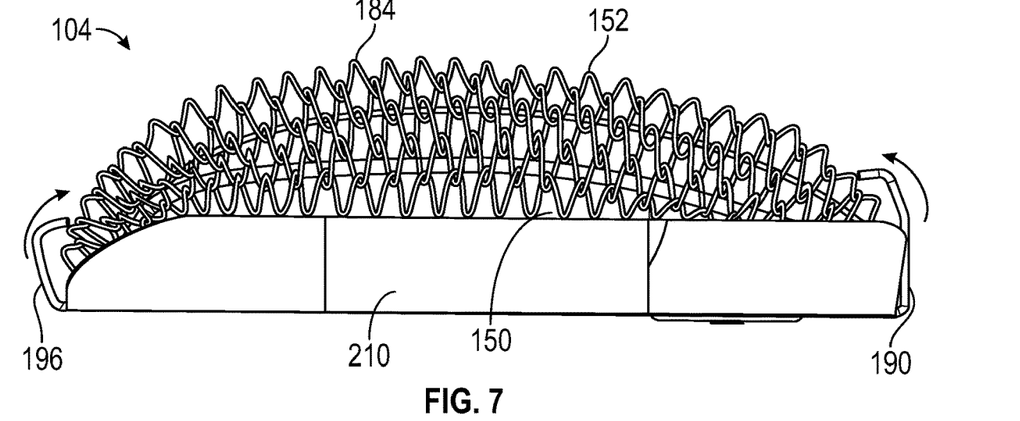

In FIG. 6, to initially secure the scrubbing member 152 to the compressible member 150, a strap 296 can be connected to an underside of the compressible member 150. By way of example, the strap 296 can be received in a channel 298 formed in the bottom surface 254 of the compressible member 150. When the strap 296 is provided, the exemplary method includes folding opposite end portions of the strap 296 over the sides 164, 166 of the compressible member 150 and into engagement with the scrubbing member 152. In FIG. 7, the step of moving each of the first clamp 190 and the second clamp 196 into engagement with the scrubbing member 152 includes bending each of the first clamp and the second clamp toward the compressible member 150 of cleaning implement.

As indicated, the compressible member 150 is made from silicone, and an outer surface 170 of the compressible member in direct contact with the scrubbing member 152 is defined by peaks 172 and valleys 174 that are longitudinally extended in a first direction of the compressible member and arranged in an alternating manner in a second direction of the compressible member. The exemplary method includes positioning the scrubbing member 152 on the outer surface 170 so that the coils 184 are extended in the first direction and longitudinally aligned with the peaks and valleys. This allows the coils 184 to conform to the contour of the outer surface 170 of the compressible member 150 during use of the grill-cleaning tool 100.

It will be appreciated that the above-disclosed embodiments and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A grill-cleaning tool, comprising:
a cleaning head;
a cleaning implement connected to an underside of the cleaning head, the cleaning implement including a first end and a second end opposite the first end relative to a length dimension of the cleaning head, and a first side and a second side opposite the first side relative to a width dimension of the cleaning head, the cleaning implement including a compressible member and a scrubbing member covering the compressible member, the scrubbing member fabricated from a metallic-mesh material and defines a working outer surface of the cleaning implement;
at least one clamp connected to one of the underside of the cleaning head and the cleaning implement, the at least one clamp rotated into engagement with the metallic-mesh material of the scrubbing member to secure the scrubbing member in place on the compressible member; and
first and second locating tabs provided on one of the underside of the cleaning head and the cleaning implement, the first and second locating tabs are received in respective first and second openings provided on the compressible member, wherein a spacing between the first and second openings is less than a spacing between the first and second locating tabs such that the compressible member is at least partially stretched for fitting onto the first and second locating tabs.

2. The tool of claim 1, wherein the at least one clamp is a first clamp located at the first end of the cleaning implement.

3. The tool of claim 2, wherein the first clamp is configured to be rotated into engagement with the scrubbing member.

4. The tool of claim 2, further including a second clamp connected to one of the underside of the cleaning head and the cleaning implement, the second clamp located at the second end of the cleaning implement, the second clamp configured to secure the scrubbing member in place on the compressible member.

5. The tool of claim 4, wherein the second clamp is configured to be rotated into engagement with the scrubbing member.

6. The tool of claim 1, wherein the cleaning implement includes a cartridge configured for removable connection to the underside of the cleaning head, the compressible member and the scrubbing member mounted within the cartridge.

7. The tool of claim 6, wherein the compressible member includes an outer surface at least partially projecting outwardly from the cartridge.

8. The tool of claim 6, wherein the at least one clamp is fixedly secured to the cartridge and defines at least one end portion of the cartridge.

9. The tool of claim 6, further including a latching arrangement carried by the cleaning head and the cartridge for the removable connection of the cartridge to the cleaning head.

10. The tool of claim 1, wherein the compressible member is made from silicone, and an outer surface of the compressible member in direct contact with the scrubbing member is defined by peaks and valleys arranged in an alternating manner in a width direction of the compressible member.

11. The tool of claim 1, wherein the metallic-mesh material is made from interconnected stainless steel coils.

12. A grill-cleaning tool, comprising:
a cleaning head including a first mounting structure; and
a cleaning implement removably connected to an underside of the cleaning head, the cleaning implement including:
a cartridge,
a compressible member mounted within the cartridge,
a scrubbing member fabricated from a metallic-mesh material, the scrubbing member entirely covering an outer surface of the compressible member, the scrubbing member defining a working outer surface of the cleaning implement,
at least one clamp connected to the cartridge and configured to secure the scrubbing member in place on the compressible member, the at least one clamp including an edge portion movable to directly engage the metallic-mesh material of the scrubbing member, and
a second complementary mounting structure carried by the cartridge for engagement with the first mounting structure,
wherein the first mounting structure further includes a securing tab provided on the underside of the cleaning head and the second mounting structure includes a correspondingly shaped opening extended through the cartridge for receiving the securing tab, the securing tab directly engaging the cartridge.

13. The tool of claim 12, wherein the first mounting structure and second mounting structure include a latching arrangement for releasably connecting the cartridge to the cleaning head.

14. The tool of claim 12, wherein the at least one clamp is a first clamp including a first edge portion directly engaging the scrubbing member.

15. The tool of claim 14, further including a second clamp connected to the cartridge, the second clamp located opposite the first clamp, the second clamp including a second edge portion directly engaging the scrubbing member.

16. The tool of claim 12, further including a strap connected to an underside of the compressible member, opposite end portions of the strap adapted to engage the scrubbing member.

17. The tool of claim 12, wherein the metallic-mesh material is made from interconnected stainless steel coils, and the compressible member is made from silicone.

18. A method of assembling a grill-cleaning tool, the method comprising:
  providing a compressible member;
  providing a scrubbing member fabricated from a metallic-mesh material made from interconnected metal coils;
  positioning the scrubbing member directly over an outer surface of the compressible member;
  wherein the scrubbing member positioned over the compressible member defines a cleaning implement for the grill-cleaning tool, and the method includes,
  providing a first clamp, positioning the first clamp adjacent a first end of the cleaning implement so that the first clamp is outward of the first end relative to a length dimension of the cleaning implement, and bending the first clamp in the length dimension from an initial first clamp position toward the cleaning implement to move a first engaging edge portion of the first clamp into engagement with the metallic-mesh material of the scrubbing member; and
  providing a second clamp, positioning the second clamp adjacent a second end of the cleaning implement that is opposite the first end so that the second clamp is outward of the second end relative to the length dimension of the cleaning implement, and bending the second clamp in the length dimension from an initial second clamp position toward the cleaning implement to move a second engaging edge portion of the second clamp into engagement with the metallic-mesh material of the scrubbing member,
  wherein engagement of the first and second clamps with the scrubbing member secures the scrubbing member on the compressible member.

\* \* \* \* \*